(12) United States Patent
van Iersel et al.

(10) Patent No.: US 6,327,468 B1
(45) Date of Patent: Dec. 4, 2001

(54) METHOD AND APPARATUS FOR RELOCATING A BEACON IN A WIRELESS SYSTEM

(75) Inventors: Hans van Iersel, Emmen; Corné van Puijenbroek, Enschede, both of (NL)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/189,814

(22) Filed: Nov. 10, 1998

(51) Int. Cl.[7] .................................................... H04Q 7/22
(52) U.S. Cl. ....................... 455/434; 455/450; 455/515; 370/343
(58) Field of Search ................................. 455/434, 450, 455/515, 511, 451, 452, 509; 370/329, 343, 498

(56) References Cited

U.S. PATENT DOCUMENTS

| | | | |
|---|---|---|---|
| 4,633,509 | * | 12/1986 | Scheinert ............................... 455/434 |
| 5,109,527 | * | 4/1992 | Akerberg ............................... 455/434 |
| 5,381,443 | * | 1/1995 | Borth et al. ........................... 455/434 |
| 5,570,467 | * | 10/1996 | Sawyer ................................. 455/515 |
| 5,606,548 | * | 2/1997 | Vayrynen et al. ..................... 455/434 |
| 6,032,047 | * | 2/2000 | Cerwall et al. ....................... 455/450 |
| 6,137,772 | * | 10/2000 | Turcotte et al. ....................... 370/29 |

OTHER PUBLICATIONS

*Federal Communications Commission (FCC) Rules*, Part 15, Subpart D—Unlicensed Personal Communications Service Devices, Sections 15.301–15.323.

* cited by examiner

Primary Examiner—Vivian Chang
Assistant Examiner—Duc Nguyen
(74) Attorney, Agent, or Firm—Jenkens & Gilchrist, A Professional Corporation (57) ABSTRACT

A method and apparatus in a wireless communications system enables a beacon to be leap-frogged. The system includes at least one radio fixed part (RFP) that is in radio communication with multiple portable parts (PP). According to the present invention, the RFP is originally broadcasting with an old beacon. Prior to the expiration of a maximum continuous broadcast period, the RFP determines an appropriate channel for a new beacon. The new beacon must be on a different carrier from that of the old beacon. Furthermore, the RFP must comply with the listening before talking and least interfering channel protocols. The RFP may then begin broadcasting with the new beacon. Prior to terminating the old beacon, the RFP informs associated PPs of the location of the new beacon in a system information broadcast on the old beacon. The old beacon is then terminated within the maximum continuous broadcast period.

42 Claims, 6 Drawing Sheets

METHOD AND APPARATUS FOR RELOCATING A BEACON IN A WIRELESS SYSTEM

BACKGROUND OF THE INVENTION

1. Technical Field of the Invention

The present invention relates in general to the field of telecommunications, and in particular, to relocating a beacon in a wireless communications system such that mobile terminals know where to find it.

2. Description of Related Art

Wireless communication systems provide many benefits to both subscribers and network providers. Subscribers enjoy increased safety, convenience, and productivity while wireless network providers are able to provide telephone service with only incremental capital investments. Incremental capital investments are possible because some of today's modern wireless systems enable providers to easily add base stations, and thus capacity, as subscribers request additional service.

Some of these modern wireless systems operate in unlicensed portions of the electromagnetic spectrum. When operating a wireless system at shared unlicensed frequencies, certain Federal Communications Commission (FCC) regulations apply to system information broadcast channels. For example, FCC Rule 15.323 (c)(4) prohibits channels used exclusively for control and signaling information from transmitting continuously for more than 30 seconds. Beacon information is typically control or signaling information (or both) that is broadcast either exclusively or along with other information. Broadcast beacon channels, which aid in the operation of wireless systems, may therefore be subject to FCC Rule 15.323 (c)(4), depending on the content and intended intermittency of a given beacon channel.

Due to the randomness and uncertainty of the radio environment, complying with this FCC regulation and repeating the access criteria virtually guarantees that the same channel will not be consistently selected for the wireless beacon, nor will associated mobile terminals be able to predict the beacon channel selection process. Unfortunately, mobile terminals in wireless systems need to be able to receive system information broadcasts and must therefore locate the wireless beacon that is being broadcast from the associated base station.

Mobile terminals in conventional systems scan all of the available channels to locate the wireless beacon. Disadvantageously, when a mobile terminal must search the spectrum for its associated beacon every 30 seconds, considerable battery power is expended. In other words, the scanning causes battery life to suffer significantly, which reduces both the talktime and the standby time of the mobile terminal. This excessive power expenditure applies to all mobile terminals locked to a particular hopping beacon.

In summary, existing wireless systems have required that mobile terminals waste battery power in order for the system to comply with FCC regulations. It would be advantageous if mobile terminals could locate a channel-hopping beacon without the necessity of repeatedly scanning (e.g., every 30 seconds) all of the available channels.

SUMMARY OF THE INVENTION

The present invention provides a method and apparatus in a wireless communications system that enables a beacon to be leap-frogged. The system includes at least one radio fixed part (RFP) that is connected to a central control fixed part (CCFP) and is in radio communication with multiple portable parts (PP). The wireless communications system is adapted to operate in an unlicensed portion of the spectrum. Consequently, any channel that exclusively broadcasts control and signaling information must periodically change channels.

According to a first aspect of the present invention, an RFP is originally broadcasting system information with an old beacon on a first channel (a particular time slot and carrier pair). Prior to the expiration of a maximum continuous broadcast period, the RFP determines an appropriate second channel for a new beacon by performing access criteria. For example, the new beacon must be on a different carrier from the old beacon. Furthermore, the RFP must comply with the listening before talking and least interfered with channel protocols.

The RFP then begins broadcasting system information with the new beacon using the second channel. Prior to terminating the old beacon, the RFP informs associated PPs of the location (e.g., the carrier and time slot of the second channel) of the new beacon in a system information broadcast with the old beacon on the first channel. The old beacon is then terminated within the maximum continuous broadcast period to maintain compliance with FCC regulations. The beacon leapfrog-hopping is periodically repeated.

An object of the present invention is to provide a wireless communications system that comports with the FCC rules for unlicensed spectrum.

Another object of the present invention is to provide a wireless communications system that conserves battery power.

A further object of the present invention is to implement a method and apparatus in a wireless communications system that obviates the need for a terminal to constantly scan the entire allocated spectrum to locate a control and signaling information beacon.

Yet another object of the present invention is to implement a method and apparatus in a wireless communications system that enables terminals to know where to locate a control and signaling information beacon.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

In the following description, for purposes of explanation and not limitation, specific details are set forth, such as particular circuits, code, techniques, etc. in order to provide a thorough understanding of the present invention. However it will be apparent to one of ordinary skill in the art that the present invention may be practiced in other embodiments that depart from these specific details. In other instances, detailed descriptions of well-known methods, software, and circuits are omitted so as not to obscure the description of the present invention with unnecessary detail.

A preferred embodiment of the present invention and its advantages are best understood by referring to FIGS. 1–5 of the drawings, like numerals being used for like and corresponding parts of the various drawings.

The principles of the present invention are described in relation to the exemplary DCT-1900 system (available from Ericsson, Inc.), which provides Personal Communications Services (PCS) in the United States according to the Personal Wireless Telecommunications (PWT) standard. However, other systems having similar characteristics, such as those complying with the Digital European Cordless Telephone (DECT) standard, are equally applicable.

A wireless system as described hereinbelow may be used in a campus or work environment to provide telephone portability to users. Alternatively, the wireless system can be employed in place of a wired local loop, thus obviating the need for wired connections in the final portion of a Public Switched Telephone Network (PSTN). Although the present invention is described in relation to the DCT-1900 system, the principles have equal efficacy in wireless systems generally, especially those that are subject to Part 15 of the FCC rules.

In particular, when operating in an unlicensed portion of the spectrum (e.g., providing Unlicensed Personal Communications Services (U-PCS)), the FCC part 15 rules apply. A wireless system that is operating in accordance with the present invention advantageously uses the beacons of PWT-based systems in a manner that complies with the FCC rules. The objectives of the FCC rules of part 15(D) are (i) to achieve coexistence in the unlicensed spectrum between similar U-PCS devices and (ii) to prevent interference between U-PCS devices and incumbent fixed microwave devices. The unlicensed spectrum of the described preferred embodiment is elucidated by the PWT(-E) standard. The present invention advantageously complies with the FCC regulations while conserving mobile terminal battery power by periodically relocating a beacon in such a way that mobile terminals constantly know where to find it.

Figure 1:
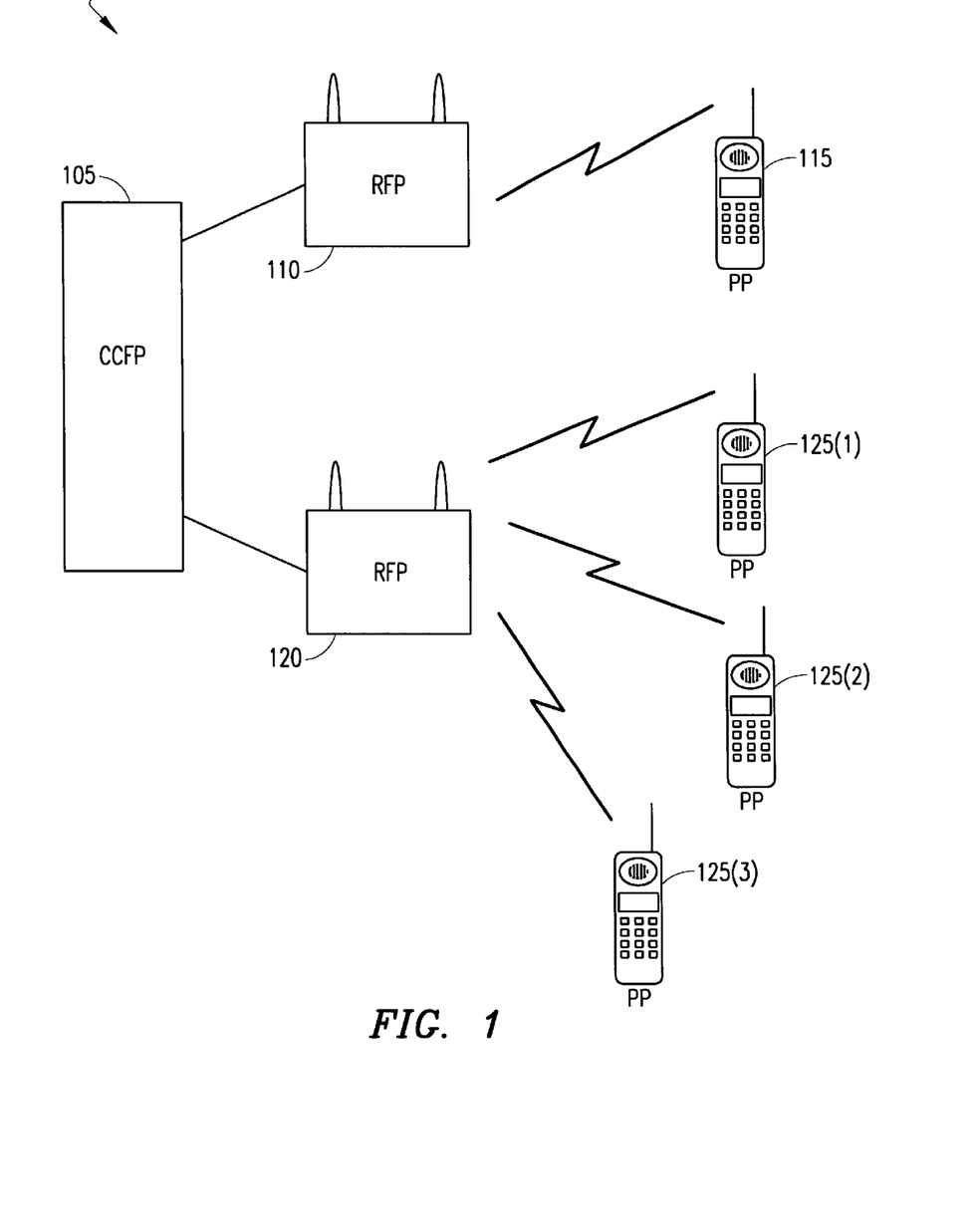
FIG. 1 illustrates a general wireless communications system that can be used to implement the present invention.

With reference to FIG. 1, a wireless communications system is shown generally at 100. However, as explained above, wireless communications systems generally may benefit from the principles of the present invention. A central control fixed part (CCFP) 105 forms the backbone of the system 100. The CCFP 105 may be directly connected to a telephone switch (not shown), such as the AXE system of Ericsson, Inc.

Multiple radio fixed parts (RFPs) are connected by wire to the CCFP 105. However, in alternative embodiments the connection can be wireless. An RFP 110 is in radio communication with a portable part (PP) 115. An RFP 120 is in radio communication with multiple PPs 125(1), 125(2), and 125(3) (generally referred to as 125(n)). The RFPs 110 and 120 broadcast beacons (e.g., containing control and signaling information) to coordinate the operation of the wireless communications system 100. The RFPs and PPs of this exemplary embodiment can be more broadly characterized as base stations and mobile terminals, respectively.

Figures 2A, 2B:
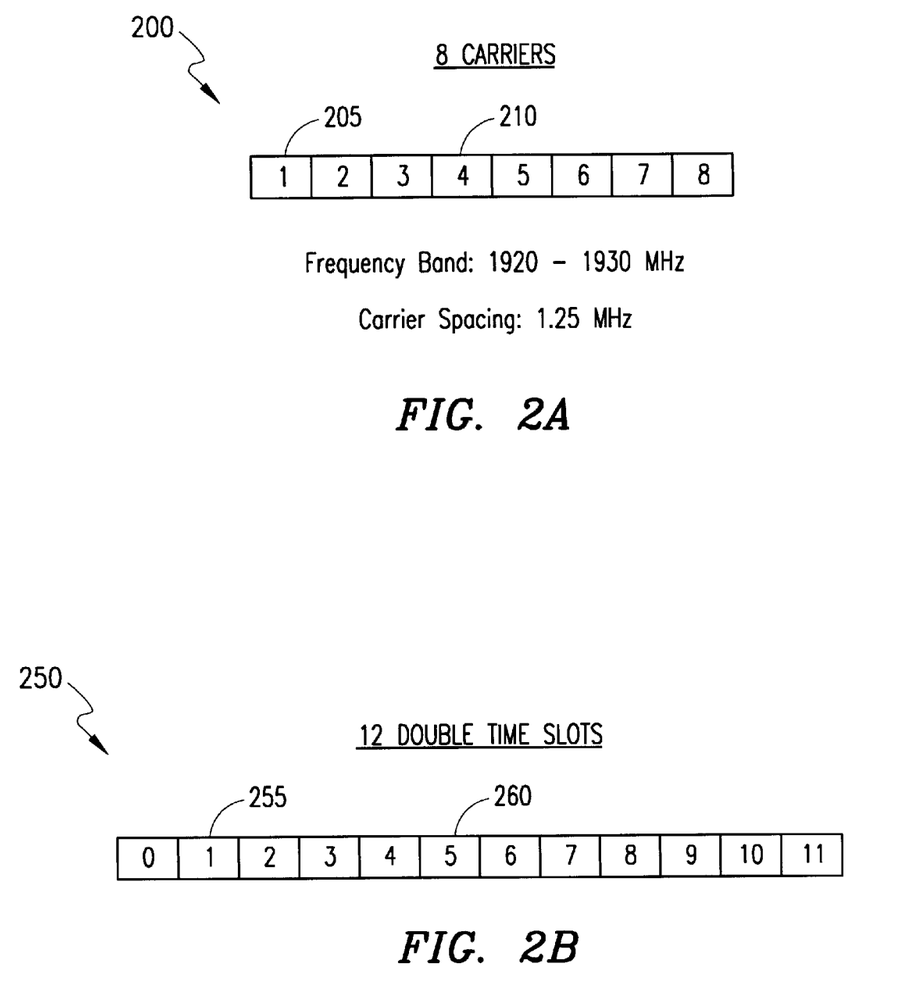
FIG. 2A illustrates a first aspect of an air interface that can be used with the present invention.
FIG. 2B illustrates a second aspect of an air interface that can be used with the present invention.

Referring now to FIG. 2A, eight possible carriers within a single frequency band for the wireless communications system 100 (of FIG. 1) are illustrated generally at 200. In a preferred embodiment, the frequency band of the system 100 spans the 1920–1930 MHZ spectrum. The carrier spacing is 1.25 MHZ. It should be understood that the system can operate outside the radio frequency range and can accommodate either more or less than the exemplary eight carriers. Carrier One 205 and Carrier Four 210 are specifically denoted amongst the eight carriers 200.

Referring now to FIG. 2B, twelve double time slots for the wireless communications system 100 (of FIG. 1) are illustrated generally at 250. A double time slot corresponds to two single time slots; two single time slots permit a full duplex communication (e.g., in Time Division Duplex (TDD) fashion). While a preferred embodiment provides for twelve TDD time slots (24 single time slots), the invention is not intended to be so limited. Any number of double (single) time slots can alternatively be substituted for twelve (twenty-four). A double time slot (hereinafter "time slot" or TS) One 255 and a TS Five 260 are specifically denoted amongst the twelve TSs 250. Preferably, the twelve TSs occupy one Time Division Multiple Access (TDMA) frame that lasts 10 milliseconds. Thus, a dozen pairs of communications (e.g., each consisting of one communication downlinked from the RFP to a PP and one communication uplinked from the PP to the RFP) occur each frame, or every 10 milliseconds, per carrier frequency.

In the wireless communications system 100, each duplex physical communications channel is defined by a carrier (from among the eight shown at 200) and a TS (from among the twelve shown at 250). Each carrier preferably provides 12 TSs in TDMA fashion to up to twelve PPs. Hence, a total of 120 channels are provided for in a preferred embodiment, but the present invention may encompass a different total number of channels.

Figure 3:
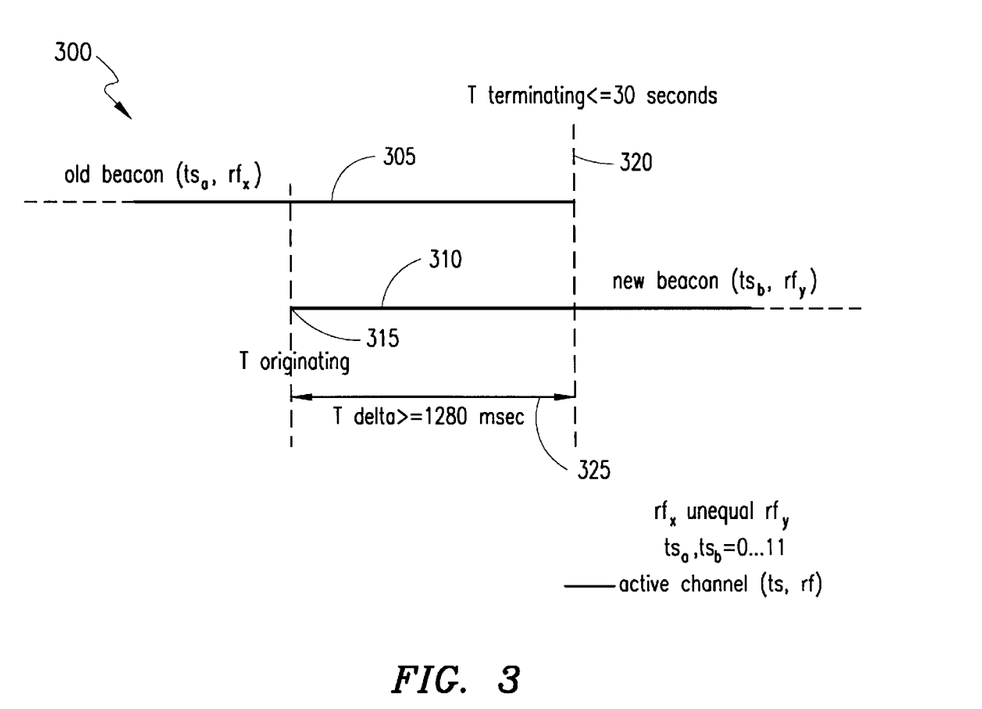
FIG. 3 illustrates an exemplary beacon-hopping procedure according to the present invention.

Referring now to FIG. 3, an exemplary beacon-hopping procedure according to the present invention is illustrated. An old beacon (OB) 305 is shown terminating a broadcast, and a new beacon (NB) 310 is shown originating a broadcast. The OB 305 and NB 310 are broadcast by, for example, the RFP 120 and potentially received and processed by the PPs 125(n). It should be noted that in the description below of FIGS. 3–5 several generic terms are used to indicate the breadth and scope of the present invention. For example, "$rf_x$" and "$rf_y$" refer to any general radio frequency that is available within the wireless communications system 100. These carrier frequencies (radio or otherwise) are shown in FIG. 2A and are described hereinabove. Also, "$ts_a$" and "$ts_b$" refer to any general time slot that is provided on a given carrier frequency. These time slots are shown generally in FIG. 2B and are described hereinabove.

In the wireless communications system 100, the RFPs 110 and 120, along with the PPs 115 and 125(n), must share the assigned spectrum. Other RFPs (not shown) that are attached to the CCFP 105 as well as other wireless communications systems may also be sharing the assigned spectrum. The goal of the FCC regulations is to ensure harmonious, yet possibly uncoordinated, sharing of the unlicensed spectrum.

The relevant FCC rule is section 15.323(c)(4). The rule states:

> Once access to specific combined time and spectrum windows is obtained an acknowledgment from a system participant must be received by the initiating transmitter within one second or transmission must cease. Periodic acknowledgments must be received at least every 30 seconds or transmission must cease. Channels used exclusively for control and signaling information may transmit continuously for 30 seconds without receiving acknowledgments, at which time the access criteria must be repeated.

The last sentence is particularly pertinent. As a consequence of this rule, an RFP cannot transmit a simplex channel (e.g., a beacon) on the same channel for more than 30 seconds without receiving an acknowledgment from a PP (e.g., a setup request) or repeating the access criteria. If an acknowledgment is not received, then transmission must cease on or before the 30 second time limit.

Repetition of the access criteria, coupled with the changing conditions of the radio environment, virtually ensures that the same channel will not be consistently selected. The present invention saves battery power of PPs by broadcasting the location of the NB 310 on the OB 305 prior to the termination of the old OB 305. Consequently, PPs are not required to search the spectrum for a NB 310 every 30 seconds.

The beacon leapfrog-hopping aspect of the present invention is based on a procedure whereby a current, terminating beacon (e.g., the OB 305) at $T_{terminating}$ 320 broadcasts from the RFP 120 to all PPs 125(n) that are locked onto the OB 305 a location of a subsequent, originating beacon (e.g., the NB 310). The broadcast of the location preferably occurs at $T_{terminating}$ 320, but it may also occur anytime before $T_{terminating}$ 320 and after the NB 310 location has been determined.

This NB 310 is already active at $T_{terminating}$ 320. At $T_{originating}$ 315, the NB 310 has just passed the FCC access criteria, such as the "Listen Before Talk" (LBT) criterion, "Least Interfered Channel" (LIC) criterion, and unequal carriers of the beacons ($rf_x$ does not equal $rf_y$) criterion. After the access criteria has been met, the location of the NB 310 is determined to be "($ts_b$, $rf_y$)", or in accordance with FIGS. 2A and 2B "(a TS from 250, a Carrier from 200)".

Exemplary LBT and LIC criteria are explained in the FCC regulations at, for example, Subpart D, Section 15.323 (c), especially paragraphs (c)(1) to (c)(5), which Section is hereby incorporated by reference herein in its entirety. To execute the LBT procedure, devices monitor for a preselected amount of time the combined time and spectrum windows (e.g., channel) in which they intend to transmit immediately prior to initiating transmission. The monitoring threshold is preferably less than or equal to 30 dB above the thermal noise power for a given bandwidth. If no signal above the threshold is detected, then transmission may commence. When implementing the LIC criterion, the channel with the lowest power level below a monitoring threshold of 50 dB above the thermal noise power level for a given bandwidth may be accessed after the LBT procedure fails to provide a suitable channel candidate. Certain time periods apply to the LIC criterion under the FCC regulations (e.g., see 15.323 (c)(5)). It should be understood that these are merely exemplary LBT and LIC criteria and that the invention is not intended to be limited by the specific description of the FCC regulations as explained above. Furthermore, it is contemplated that the invention embraces any required or desired access criteria in addition to or instead of the LBT and LIC criteria.

The present invention enables the PPs 125(n) to lock onto the NB 310 of the same RFP 120 as the OB 305. PPs 125(n) are thus ready to listen before the next instance of broadcast information. RFP beacons in the wireless communications system 100 preferably have fixed periods of system information broadcasts (SIBs). In fact, an SIB preferably occurs every 8 times 16 TDMA frames, which equates to a $T_{delta}$ 325 of 1280 milliseconds in a preferred embodiment. Each RFP (e.g., RFPs 110 and 120) broadcasts its own succeeding NB 310 location (a TS from 250, a Carrier from 200) in an SIB. So as a result, this SIB now contains RFP-specific information. By ensuring that the period between $T_{originating}$ 315 and $T_{terminating}$ 320 is greater than or equal to 1280 milliseconds, at least one SIB is guaranteed to occur. Preferably, at least every 30 seconds, the beacons leap-frog whereby the predecessor announces its successor to thereby comply with the FCC regulations.

In the description above and below, specific parts from the wireless communications system 100 and specific channels from FIGS. 2A and 2B are selected to illuminate the principles of the present invention. It is to be understood that this is by way of example only, and the invention is not intended to be so limited. Furthermore, though DCT-1900 terminology is used (e.g., RFP and PP), it should be understood that the present invention applies equally to wireless systems generally (e.g., base station and mobile terminal, respectively).

Figure 4A:
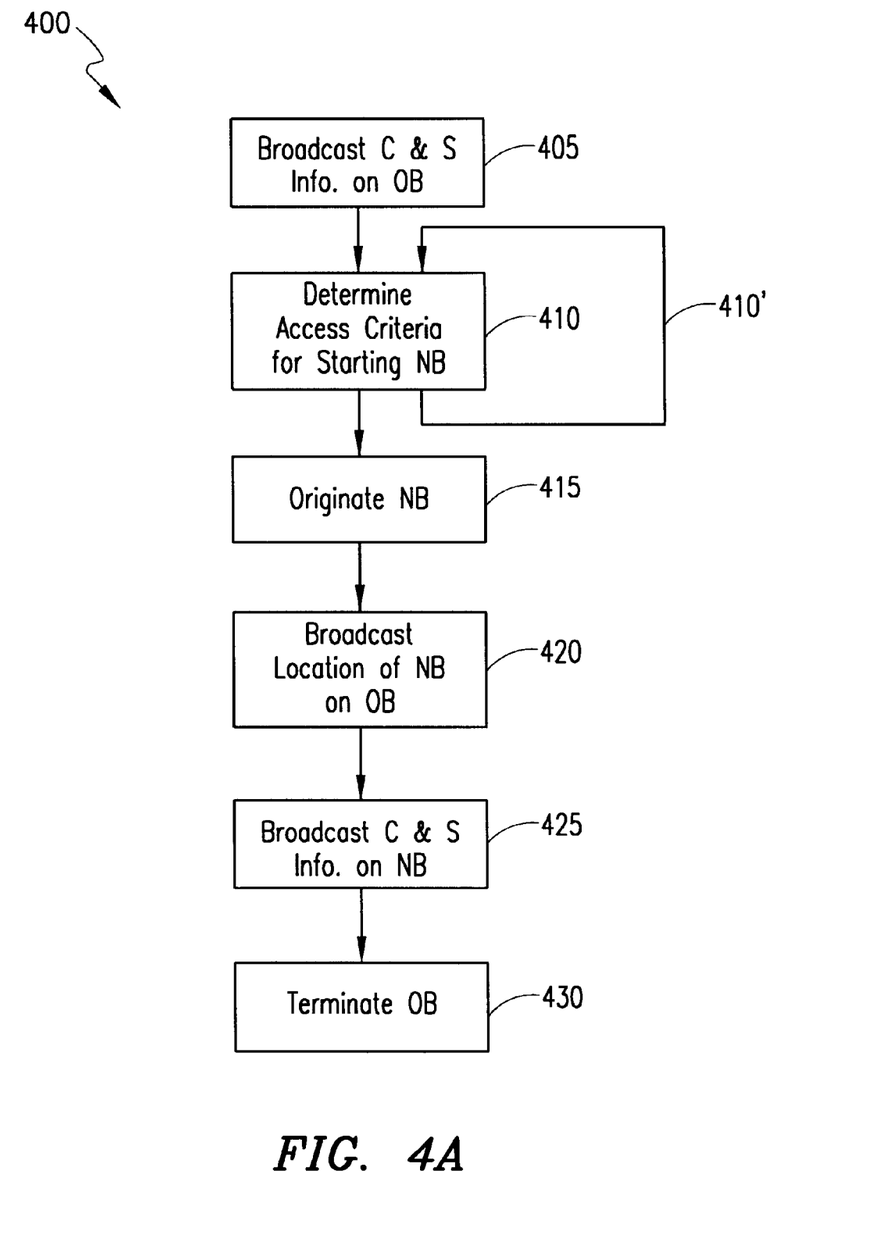
FIG. 4A illustrates in flowchart form a method of hopping a beacon according to a first aspect of the present invention.

Referring to FIG. 4A, a method of hopping a beacon according to a first aspect of the present invention is illustrated in flowchart 400 from the perspective of the RFP 120. The RFP 120 is initially broadcasting control and signaling information at step 405 on the OB 305. The RFP 120 determines appropriate parameters to comport with access criteria (as explained in greater detail hereinbelow) for originating the NB 310 at step 410. If the access criteria for the NB 310 cannot be met, the OB 305 should nevertheless be terminated within the 30 seconds under the current FCC rules. Furthermore, if the access criteria for starting the NB 310 is not satisfied on an initial attempt, then subsequent attempts are preferably made until one is successful, as indicated by arrow 410'. At step 415, the RFP 120 originates the NB 310. Subsequently, the RFP 120 broadcasts at step 420 the location of the NB 310 on the OB 305. The RFP 120 is, by the time of the location broadcast in step 420, broadcasting control and signaling information on the NB 310 at step 425. The RFP 120 at step 430 terminates the OB 305 in order to complete the beacon leapfrog-hopping procedure.

Figure 4B:
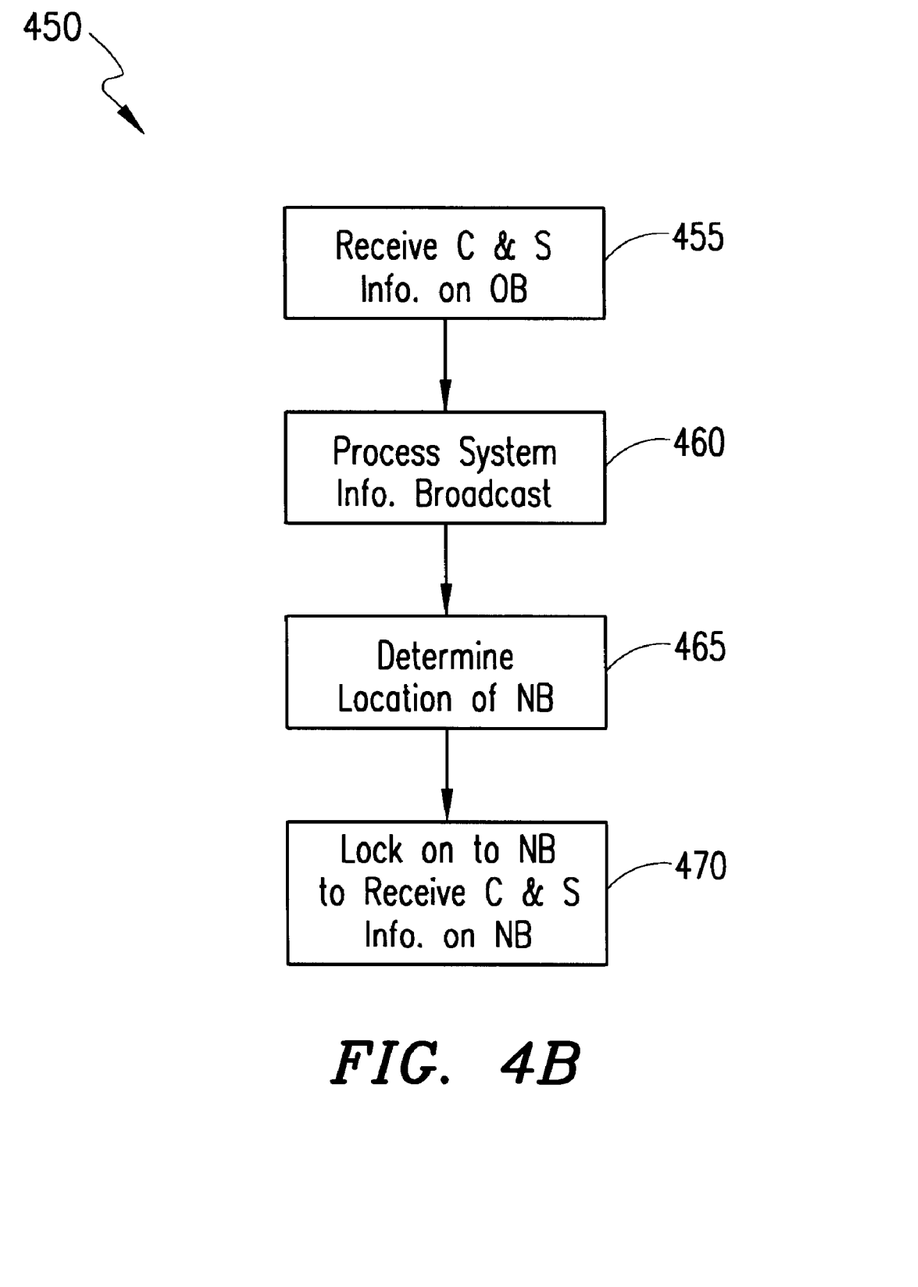
FIG. 4B illustrates in flowchart form a method of switching reception from an old beacon to a new beacon according to a second aspect of the present invention.

Referring to FIG. 4B, a method of switching reception from an old beacon to a new beacon according to a second aspect of the present invention is illustrated in flowchart 450 from the perspective of the PPs 125(n). A PP 125(n), for example PP 125(2), is initially receiving control and signaling information on the OB 305 on a first channel ($ts_a$, $rf_x$) at step 455. The PP 125(2) receives and processes an SIB at step 460. From the processing of the SIB, the PP 125(2) determines at step 465 the location, in other words the second channel ($ts_b$, $rf_y$), of the NB 310.

The PP 125(2) switches to the second channel and locks on to the NB 310 at step 470 in order to receive the control and signaling information being broadcasted (eventually solely) on the NB 310. This aspect of the beacon leapfrog hopping prevents the PP 125(2) from needing to scan all of the possible 120 channels, which consumes significant battery power. Therefore, battery power is conserved and talktime and stand-by time are improved for the user.

Figure 5:
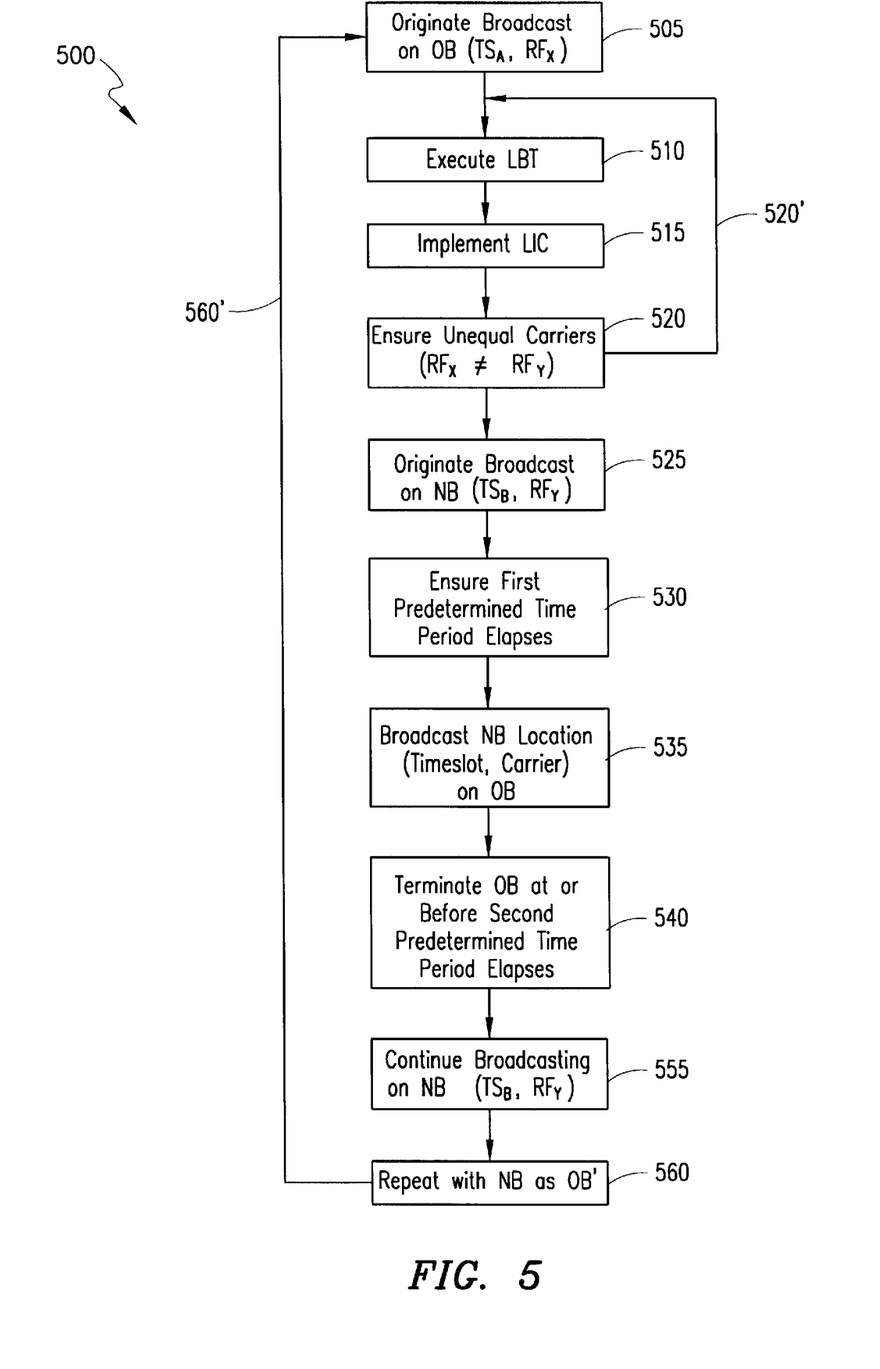
FIG. 5 illustrates in flowchart form another method of hopping a beacon according to a third aspect of the present invention.

Referring to FIG. 5, another method of hopping a beacon according to a third aspect of the present invention is illustrated in flowchart 500 from the perspective of the RFP 120. The RFP 120 initially originates a broadcast on the OB 305 with a first channel ($ts_a$, $rf_x$) at step 505. In this example, the first channel corresponds to Carrier One 205 and TS Five 260 (from FIGS. 2A and 2B, respectively).

The RFP 120 needs to perform the relevant access criteria to prepare for beginning a NB 310. At step 510, the RFP 120 executes an LBT procedure. The RFP 120 receives on channels until it detects that a second channel ($ts_b$, $rf_y$) is available (i.e., not in use or at least not overpowered by others in the wireless system 100 or another proximate system). This second channel corresponds to Carrier Four 210 and TS One 255 in this example. The LBT procedure is explained in greater detail hereinabove in connection with FIG. 3.

The RFP 120 implements the LIC criterion at step 515. It selects a second channel that is likely to be the least interfering and the least interfered with of the available channels. The LIC criterion is also explained in greater detail hereinabove in connection with FIG. 3. The RFP 120 also ensures that the carriers of the first and second channels for the OB 305 and NB 310, respectively, are unequal at step 520. If the carriers of the first and second channels for the OB 305 and NB 310, respectively, are not determined to be unequal at step 520, then the LBT and LIC steps are repeated as indicated by arrow 520'. It should be understood that these enumerated access criteria in steps 510–520, as well as other FCC access criteria, may be performed in a myriad of possible orders without departing from the scope and spirit of the present invention. Once a suitable second channel ($ts_b$, $rf_y$) that best meets the relevant access criteria has been determined, e.g., a channel at Carrier Four 210 and with the TS One 255, the RFP 120 can proceed with the beacon leapfrog-hopping method.

The RFP 120 originates the broadcasting of the NB 310 on the second channel ($ts_b$, $rf_y$), e.g., using Carrier Four 210 and the TS One 255, at step 525. The RFP 120 also ensures that a first predetermined time period elapses at step 530. In a preferred embodiment, this first predetermined time period corresponds to the $T_{delta}$ 325 of FIG. 3. By ensuring that this period elapses, the RFP 120 can be certain that sufficient time is available to broadcast at step 535 the location of the NB 310 ($ts_b$, $rf_y$), e.g., Carrier Four 210 and the TS One 255, on the first channel of the OB 305 ($ts_a$, $rf_x$), e.g., Carrier One 205 and the TS Five 260.

The RFP 120 terminates the OB 305 at step 540 at or prior to the expiration of a second predetermined time period. This second predetermined time period preferably corresponds to 30 seconds to comply with the FCC regulations. However, other time periods can be used for different regulatory requirements, for example. The RFP 120 continues broadcasting on the NB ($ts_b$, $rf_y$), e.g., at Carrier Four 210 and with the TS One 255, at step 555. Step 560, in conjunction with arrow 560', indicates that the process is periodically repeated (e.g., every 30 seconds) with the NB 310 as the OB' in a subsequent iteration of the method of flowchart 500. With the beacon leapfrog-hopping method and apparatus of the present invention, battery power is conserved while complying with FCC regulations.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method in a wireless communications system for relocating a beacon in a known manner, comprising the steps of:

originating a first broadcasting of beacon information on a first channel;

broadcasting a location of a second channel for directing at least one mobile station to switch from said first channel to said second channel on said first channel;

originating a second broadcasting of beacon information on said second channel;

receiving, by the at least one mobile station, of the location of said second channel on said first channel;

responsive to said step of receiving, switching by said at least one mobile station from said first channel to said second channel; and terminating the first broadcasting of beacon information on said first channel after the second broadcasting of beacon information on said second channel has originated.

2. The method according to claim 1, wherein said step of broadcasting a location of a second channel further comprises:

determining whether a test channel has a signal above a predetermined threshold; and selecting said test channel as said second channel if said test channel does not have said signal above said predetermined threshold.

3. The method according to claim 1, wherein said step of broadcasting a location of a second channel further comprises:

determining a test channel having a lowest power level below a predetermined threshold; and selecting said test channel as said second channel.

4. The method according to claim 1, wherein said step of broadcasting a location of a second channel further comprises:

ascertaining a first carrier frequency of said first channel;

determining a second carrier frequency that differs from said first carrier frequency; and selecting said second carrier frequency for said second channel.

5. The method according to claim 1, further comprising the step of:

waiting at least a predetermined period of time between said step of originating a second broadcasting of beacon information on said second channel and said step of terminating the first broadcasting of beacon information on said first channel.

6. The method according to claim 5, wherein said step of waiting at least a predetermined period of time further comprises the step of:

waiting at least approximately 1280 milliseconds between said step of originating a second broadcasting of beacon information on said second channel and said step of terminating the first broadcasting of beacon information on said first channel.

7. The method according to claim 1, further comprising the step of:

waiting no more than a predetermined period of time between said step of originating a first broadcasting of beacon information on a first channel and said step of terminating the first broadcasting of beacon information on said first channel.

8. The method according to claim 7, wherein said step of waiting no more than a predetermined period of time further comprises the step of:

waiting no more than approximately 30 seconds between said step of originating a first broadcasting of beacon information on a first channel and said step of terminating the first broadcasting of beacon information on said first channel.

9. The method according to claim 1, wherein the first and second broadcasting of beacon information further include broadcasting control and signaling information for said wireless communications system.

10. The method according to claim 1, wherein said step of broadcasting a location of a second channel on said first channel further comprises the step of:

broadcasting a carrier frequency and a time slot of said second channel.

11. The method according to claim 1, wherein said step of broadcasting a location of a second channel on said first channel further comprises the step of:

broadcasting a location of said second channel in a system information broadcast.

12. The method according to claim 1, further comprising the step of:

repeating, at periodic intervals, the steps of originating a first broadcasting, broadcasting a location, originating a second broadcasting, and terminating the first broadcasting.

13. The method according to claim 1, wherein said steps are performed in the order listed.

14. A wireless communications system that employs a broadcast beacon that leapfrog-hops over a plurality of channels, said system comprising:

a base station that relocates said broadcast beacon from a first channel to a second channel of the plurality of channels at periodic intervals, wherein said base station broadcasts on said first channel a location of said second channel for directing mobile terminals from said first channel to said second channel and originates broadcasting of said beacon on said second channel before terminating said beacon on said first channel; and a plurality of mobile terminals that are in communication with said base station, said plurality of mobile terminals locking onto said broadcast beacon on said second channel in response to receipt on said first channel of said location of said second channel as said broadcast beacon is relocated from said first channel to said second channel, wherein said second channel is known to said plurality of mobile terminals.

15. The wireless communications system of claim 14, wherein said plurality of mobile terminals lock onto said broadcast beacon without scanning said plurality of channels.

16. The wireless communications system of claim 14, wherein said periodic intervals are approximately 30 seconds.

17. The wireless communications system of claim 14, wherein said base station broadcasts a location of a successor broadcast beacon on a predecessor broadcast beacon.

18. The wireless communications system of claim 17, wherein said location includes a carrier frequency and a time slot.

19. The wireless communications system of claim 17, wherein a first carrier frequency of said predecessor broadcast beacon differs from a second carrier frequency of said successor broadcast beacon.

20. The wireless communications system of claim 17, wherein said base station broadcasts both said successor broadcast beacon and said predecessor broadcast beacon simultaneously for at least a predetermined period of time.

21. The wireless communications system of claim 20, wherein said predetermined period of time is approximately 1280 milliseconds.

22. The wireless communications system of claim 14, wherein said broadcast beacon broadcasts control and signaling information for said wireless communications system.

23. The wireless communications system of claim 14, wherein said base station performs access criteria functions before relocating said broadcast beacon.

24. A method in a wireless communications system for relocating a beacon in a known manner, comprising the steps of:

originating a first broadcasting of beacon information on a first channel having a first carrier frequency;

broadcasting a location of a second channel for directing at least one mobile terminal to switch from said first channel to said second channel on said first channel, said second channel having a second carrier frequency, and wherein said first and second carrier frequencies are unequal;

originating a second broadcasting of beacon information on said second channel;

receiving, by the at least one mobile terminal, of the location of said second channel on said first channel;

responsive to said step of receiving, switching by said at least one mobile terminal from said first channel to said second channel;

terminating the first broadcasting of beacon information on said first channel after the second broadcasting of beacon information on said second channel has originated;

waiting no more than a predetermined period of time between said step of originating a first broadcasting of beacon information on a first channel and said step of terminating the first broadcasting of beacon information on said first channel; and repeating, periodically, the steps of originating a first broadcasting, broadcasting a location, originating a second broadcasting, terminating the first broadcasting, and waiting no more than a predetermined period of time.

25. The method according to claim 24, wherein said step of broadcasting a location of a second channel on said first channel further comprises the step of:

broadcasting said second carrier frequency and a time slot of said second channel.

26. The method according to claim 24, further comprising the steps of:

receiving said first broadcasting of beacon information on said first channel;

receiving said location of said second channel on said first channel; and switching reception from said first broadcasting of beacon information on said first channel to said second broadcasting of beacon information on said second channel.

27. The method according to claim 26, wherein said step of receiving said first broadcasting of beacon information on said first channel further comprises the step of:

receiving said beacon information in a system information broadcast.

28. The method according to claim 24, wherein the first and second broadcasting of beacon information further include broadcasting control and signaling information for said wireless communications system.

29. The method according to claim 24, further comprising the step of:
waiting at least a second predetermined period of time between said step of originating a second broadcasting of beacon information on said second channel and said step of terminating the first broadcasting of beacon information on said first channel.

30. The method of claim 24, wherein said steps are performed in the order listed.

31. A wireless communications system for relocating a beacon in a known manner, comprising:
means for originating a first broadcasting of beacon information on a first channel;
means for broadcasting a location of a second channel for directing at least one mobile station to switch from said first channel to said second channel on said first channel;
means for originating a second broadcasting of beacon information on said second channel;
means for receiving, by the at least one mobile station, of the location of said second channel on said first channel;
means for switching, responsive to receipt of said location of said second channel, of said at least one mobile station from said first channel to said second channel; and
means for terminating the first broadcasting of beacon information on said first channel after the second broadcasting of beacon information on said second channel has originated.

32. The system according to claim 31, wherein said means for broadcasting of said location of a second channel further comprises:
means for determining whether a test channel has a signal above a predetermined threshold; and
means for selecting said test channel as said second channel if said test channel does not have said signal above said predetermined threshold.

33. The system according to claim 31, wherein said means for broadcasting said location of said second channel further comprises:
means for determining a test channel having a lowest power level below a predetermined threshold; and
means for selecting said test channel as said second channel.

34. The system according to claim 31, wherein said means for broadcasting said location of said second channel further comprises:
means for ascertaining a first carrier frequency of said first channel;
means for determining a second carrier frequency that differs from said first carrier frequency; and
means for selecting said second carrier frequency for said second channel.

35. The system according to claim 31, further comprising:
means for waiting at least a predetermined period of time between origination of a second broadcasting of beacon information on said second channel and termination of the first broadcasting of beacon information on said first channel.

36. The system according to claim 35, wherein said means for waiting at least a predetermined period of time further comprises:
means for waiting at least approximately 1280 milliseconds between origination of a second broadcasting of beacon information on said second channel and termination of the first broadcasting of beacon information on said first channel.

37. The system according to claim 31, further comprising:
means for waiting no more than a predetermined period of time between origination of a first broadcasting of beacon information on a first channel and termination of the first broadcasting of beacon information on said first channel.

38. The system according to claim 37, wherein said means for waiting no more than a predetermined period of time further comprises:
means for waiting no more than approximately 30 seconds between origination of a first broadcasting of beacon information on a first channel and termination of the first broadcasting of beacon information on said first channel.

39. The system according to claim 31, wherein the first and second means for broadcasting of beacon information further include means for broadcasting control and signaling information for said wireless communications system.

40. The system according to claim 31, wherein said means for broadcasting a location of a second channel on said first channel further comprises:
means for broadcasting a carrier frequency and a time slot of said second channel.

41. The system according to claim 31, wherein said means for broadcasting a location of a second channel on said first channel further comprises:
means for broadcasting a location of said second channel in a system information broadcast.

42. The system according to claim 31, further comprising:
means for repeating, at periodic intervals, origination of a first broadcast, broadcast of a location, origination of a second broadcast, and termination of the first broadcast.

* * * * *